2,759,007

HIGH PRESSURE POLYMERIZATION OF DIALKYLCYCLOSILOXANES IN THE PRESENCE OF A BASIC CATALYST

Milton L. Dunham, Jr., Kenmore, and George H. Wagner, Clarence, N. Y., assignors to Union Carbide and Carbon Corporation, a corporation of New York No Drawing. Application June 10, 1953,
Serial No. 360,831

20 Claims. (Cl. 260—448.2)

This invention relates to organosiloxane polymers and to a process for the preparation thereof. More particularly, the invention relates to an improved process for preparing dialkylsiloxane polymers by the polymerization of dialkylcyclosiloxanes.

Dialkylsiloxane polymers are generally prepared by a process which includes as an initial step thereof, the hydrolysis of hydrolyzable dialkylsilanes to dialykylsilanols and the condensation of such silanols to low molecular weight linear and cyclic siloxanes. The linear and cyclic siloxanes are subsequently polymerized by heating in the presence of an acid or alkaline catalyst. This process may be illustrated by the following general equation:

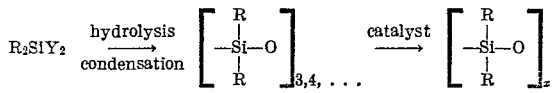

wherein R represents an alkyl radical and Y represents a hydrolyzable group such as halogen, hydrogen or an alkoxy radical.

It is well known that the molecular weight of the polymeric chains prepared by the above process may be readily controlled by the addition of appropriate amounts of chain terminators or endblocking compounds which normally comprise silicon-containing compounds having only one functional group bonded to one silicon atom thereof. The other groups bonded to the silicon atom or atoms of the compound are non-functional, that is, they do not readily react with the terminal groups of the siloxane polymer chain. Such chain endblocking compounds react with terminal groups of a polymer chain through their single functional group and upon so doing, limit further growth of such chains. In this manner the molecular weights of the siloxane polymers and, consequently, the viscosity of the product may be readily controlled so as to prepare fluids varying from light oils to greases. Such endblocked polymers are widely employed as lubricants, plasticizers, additives or as coatings for numerous purposes.

In the above described general procedure for preparing dialkylsiloxane polymers, it is well known that the hydrolysis and condensation process yield for the most part a mixture of various dialkylcyclosiloxanes. For example, there may be present in such condensate, dialkylcyclosiloxanes having 3, 4, 5 or more of the following units

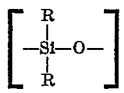

comprising the ring compound. It is well known that certain of such cyclic siloxanes, for example, octamethylcyclotetrasiloxane may be polymerized if treated with a catalyst under known conditions. However, it is also known that other cyclic siloxanes, which are normally prepared in the above hydrolysis and condensation processes, for example, octaethylcyclotetrasiloxane, are either difficult to polymerize or non-polymerizable under known conditions. Thus, a condensate containing both polymerizable and non-polymerizable cyclic siloxanes will, after being subjected to the conditions of polymerization, comprise polymers of the polymerizable cyclic siloxanes and also those non-polymerized cyclic siloxanes.

In numerous applications of dialkylsiloxane polymers, the presence of non-polymerized cyclic siloxanes in the product is undesirable as they tend to lower the viscosity thereof. Moreover, should the product be employed under conditions requiring the use of elevated temperatures, these non-polymerized cyclic compounds are volatilized. It is therefore necessary in many instances to strip or distill the non-polymerized cyclic compounds from the polymerizate before use.

Herefore, considerable effort has been directed toward finding new or improved methods for polymerizing the various dialkylcyclosiloxanes prepared by the hydrolysis and condensation processes. The use of new catalysts and of particular modifications in the known polymerization processes have been proposed. However, such methods have not been entirely satisfactory. In view of this difficulty, the condensed hydrolyzate is oftentimes treated before polymerization by various methods to remove the non-polymerizable dialkylcyclosiloxanes. Such methods are of course time-consuming and undesirable.

We have found that dialkylcyclosiloxanes may be polymerized to dialkylsiloxane polymers by a process which comprises treating such cyclosiloxanes with an alkaline catalyst at a pressure of at least 1500 pounds per square inch. Our invention makes possible the polymerization of dialkylcyclosiloxanes in greatly reduced periods of time and causes the polymerization reaction to be driven toward completion, thus resulting in yields greater than heretofore obtained. Moreover, the invention provides an effective means for polymerizing condensed dialkylsilane hydrolyzates, normally comprising a mixture of various dialkylcyclosiloxanes, to polymeric products.

The catalysts employed as indicated above are alkaline catalysts. Such catalysts if employed according to the conditions disclosed in the prior art are known to cause polymerization of the polymerizable dialkylcyclosiloxanes to dialkylsiloxane polymers. These alkaline catalysts include the alkali metal hydrides and hydroxides such as sodium and potassium hydride, sodium, potassium and lithium hydroxide; the alkali metal salts such as the alkoxides for example, sodium, and potassium ethoxide, and the quaternary ammonium hydroxides such as tetramethyl ammonium hydroxide and benzyl triethyl ammonium hydroxide. When employing an alkali metal hydroxide as the catalyst, it appears that such hydroxide initially reacts with a portion of the siloxane to form a salt. Therefore, it may be convenient to initially react the alkali metal hydroxide, for example potassium hydroxide, with a portion of the same siloxane to be polymerized to form the salt which in this instance is a potassium silanolate.

The amount of catalyst employed will vary according to the particular alkaline compound used. This is attributed to the fact that various alkaline compounds in addition to being catalysts for the polymerization reaction, also serve as endblocking compounds. A typical example of this type of catalyst are the potassium trialkylsilanolates. Therefore extremely small amounts, for example $2.6 \times 10^{-4}$ mole equivalents of catalyst per 1000 grams of cyclosiloxane, may be employed if this type of catalyst is used when preparing high molecular weight polymers. On the other hand, should less viscous and thus lower molecular weight products be prepared, the catalyst may be employed in amounts of from about 0.003 to about 0.3 mole equivalents per 1000 grams of cyclosiloxane.

In the practice of our invention pressures of at least 1500 pounds per square inch are required. We prefer to employ pressures which vary from about 15,000 to about 100,000 pounds per square inch. The process of our invention may be conducted under static conditions by charging a reactor to maximum capacity with the cyclosiloxane, sealing, and applying pressure hydrostatically by heating the charge. In this type of operation it is necessary to provide the reactor with an automatic back pressure valve to vent some of the charge in the event that pressures which may damage the system are being approached. It is also possible to conduct static operation of the process by charging the cyclosiloxane to an open reactor and applying pressure upon the charge through the open end of the reactor by means of a hydraulic press or a high pressure fluid intensifier. The hydraulic intensifier is a piston type pump and may be operated to exert high pressures by the application of a moderate pressure to the low pressure end thereof.

Our invention may also be conducted under continuous flow conditions in suitable continuous flow apparatus designed to withstand the pressures required and equipped with suitable heating means. We prefer to employ a heavy walled tube type reactor so that positive flow through the reaction zone is maintained. The pressure may be applied to the system by means of high pressure plunger pump operated by mechanical means or it may be applied by means of the hydraulic intensifier pump which has the obvious advantage of automatic pressure control.

The following examples which were carried out at temperatures ranging from about 100° C. to about 350° C., will more clearly illustrate our invention. Such examples disclose the polymerization of alkylcyclosiloxanes having the formula

[RR'SiO]

wherein R and R' represent alkyl radicals and z is an interger from 3 to 8. In the examples below, the extent of polymerization obtained is referred to in terms of the relative viscosity of the product. A product identified as being slightly viscous, will have an approximate viscosity at 25° C. of from about 1000 to about 2000 centipoises; a viscous product will have an approximate viscosity at 25° C. of from about 2000 to 10,000 centipoises; a very viscous product will have an approximate viscosity at 25° C. of from about 10,000 to about 50,000 centipoises, and an extremely viscous product will have a viscosity of above 50,000 centipoises at 25° C.

EXAMPLE I

Approximately 20 cc. of hexaethylcyclotrisiloxane, obtained by the vacuum fractionation from the crude hydrolyzate of ethyldichlorosilane, was charged with 1% by-weight of hexaethylcyclotrisiloxane of sodium ethoxide to a soft lead capsule equipped with a tapered plug seal. The insertion of the tapered plug served to force out a few drops of the charge thereby insuring a completely full capsule. The capsule was then positioned within a heavy walled heat treated alloy steel cylinder equipped with a supporting plug at one end thereof. A stell plug was inserted in the open end of the cylinder and rested upon the capsule and served to transmit force applied from a hydraulic press to the capsule, thus developing pressure upon the charge. A close fitting electric resistance furnace positioned about the cylinder supplied heat to the charge. The temperature was measured by means of a thermocouple inserted between the furnace and cylinder walls. The charge was heated to a temperature of 250° C. and a pressure of approximately 50,000 pounds per square inch was applied by the press. These conditions were maintained for a period of one hour at which time heating was discontinued and the vessel cooled to a temperature below 100° C. by means of an air blast. The pressure was then released and the capsule withdrawn and emptied. A very viscous diethylsiloxane polymer was obtained.

EXAMPLE II

Employing the identical procedure and apparatus as disclosed in Example I, a charge, comprising 20 cc. of hexaethylcyclotrisiloxane and 0.1% by-weight of the hexaethylcyclotrisiloxane of sodium ethoxide, was heated to a temperature of 250° C. and compressed at a pressure of approximately 50,000 pounds per square inch for a period of 18 hours. The pressure was then released and the capsule withdrawn and emptied. A very viscous diethylsiloxane polymer was obtained.

EXAMPLE III

Employing the identical procedure and apparatus disclosed in Example I, a charge, comprising 20 cc. of hexaethylcyclotrisiloxane and 0.8% by-weight of the hexaethylcyclotrisiloxane of sodium hydride, was heated to a temperature of 250° C. and compressed at a pressure of approximately 50,000 pounds per square inch for a period of 1¼ hours. An extremely viscous and plastic diethylsiloxane polymer was obtained.

EXAMPLE IV

Employing the identical procedure and apparatus as disclosed in Example I, a charge, comprising 20 cc. of hexaethylcyclotrisiloxane and 1.2% by-weight of hexaethylcyclotrisiloxane of a potassium silanolate catalyst, was heated to a temperature of 290° C. and compressed at a pressure of approximately 50,000 pounds per square inch for a period of one hour. The catalyst was prepared by charging equimolar quantities of potassium hydroxide and octaethylcyclotetrasiloxane together with quantities of two solvents, n-butanol and toluene, to a round-bottomed flask connected to a still column fitted with a decanting still head. The charge was heated to its reflux temperature (flask temperature approximately 132° C.). Toluene and butanol were flashed off at a pot temperature of about 85° C. and at a pressure of less than 1 mm. of mercury. This product comprised the catalyst which has the average composition

KO(Et₂SiO)₃K

The product obtained by the polymerization of hexethylcyclotrisiloxane was an extremely viscous diethylsiloxane polymer having a viscosity of well above 50,000 centipoises at 25° C.

EXAMPLE V

Employing the identical procedure and apparatus disclosed in Example I, a charge comprising 20 cc. of hexaethylcyclotrisiloxane, 1% by-weight of hexaethylcyclotrisiloxane of a potassium silanolate catalyst (prepared as disclosed in Example IV) and 1% by-weight of hexaethylcyclotrisiloxane of hexamethyldisiloxane, a chain terminating compound, was heated at a temperature of 290° C. and compressed at a pressure of approximately 50,000 pounds per square inch for a period of one hour. A very viscous diethylsiloxane polymer having a viscosity of approximately 30,000 centipoises at 25° C. was obtained.

EXAMPLE VI

A charge comprising 20 cc. of hexaethylcyclotrisiloxane, 1% by-weight of said hexaethylcyclotrisiloxane of a potassium silanolate catalyst (prepared as disclosed in Example IV) and 4% by-weight of hexaethylcyclotrisiloxane of hexamethyldisiloxane, a chain terminating compound, was heated to a temperature of 290° C. and compressed at a pressure of approximately 50,000 pounds per square inch for a period of 14½ hours. The procedure and apparatus employed was identical to that disclosed in Example I. A diethylsiloxane polymer, having a viscosity of approximately 1200–1500 centipoises at 25° C., was obtained.

EXAMPLE VII

A charge comprising 20 cc. hexaethylcyclotrisiloxane, 0.8% by-weight of the hexaethylcyclotrisiloxane of sodium hydride and 1% by-weight of the hexaethylcyclotrisiloxane of hexamethyldisiloxane, a chain terminating compound, was heated at a temperature of 250° C. and compressed at a pressure of approximately 50,000 pounds per square inch for a period of 4 hours. The identical procedure and apparatus disclosed in Example I was employed. An extremely viscous diethylsiloxane polymer was obtained.

EXAMPLE VIII

The table below comprises a tabulated account of a number of polymerization reactions wherein octaethylcyclotetrasiloxane is polymerized in accordance with the process of this invention. The catalysts employed were potassium hydroxide, sodium hydride and potassium trimethylsilanolate. Potassium silanolate compounds having the composition $KO(Et_2SiO)_6K$ and $$KO(Et_2SiO)_8K$$

were also employed as catalysts and were prepared by reacting equimolar quantities of potassium hydroxide with hexaethylcyclotrisiloxane and octaethylcyclotetrasiloxane, separately, in accordance with the procedure disclosed in Example IV. These reactions were conducted by employing the identical procedure and apparatus disclosed in Example I. Each reaction was conducted at a pressure of 50,000 pounds per square inch.

EXAMPLE IX

The table below contains tabulated data obtained in several polymerization reactions wherein octamethylcyclotetrasiloxane was polymerized in accordance with the process of the invention. The procedure followed and the apparatus employed were identical to those disclosed in Example I. In each reaction a potassium silanolate catalyst prepared as disclosed in Example IV, having the compositon $KO(Et_2SiO)_8K$, was employed.

*Table II*
POLYMERIZATIONS OF OCTAMETHYLCYLOTETRASILOXANE

| | Amount of catalyst, percent by weight of octamethyl-cyclotetra-siloxane | Temp. (°C.) | Time (hr.) | Nature of polymerized product |
|---|---|---|---|---|
| 1 | 1.0 | 275 | 3 | Very viscous. |
| 2 | 2.0 | 230 | 1 | Extremely viscous and plastic mass. |
| 3 | 2.0 | 170 | 1½ | Extremely viscous. |
| 4 | 2.0 | 175 | 2¼ | Do. |

EXAMPLE X

The table below contains data obtained from polymerization reactions wherein decaethylcyclopentasiloxane, dodecaethylcyclohexasiloxane and tetradecaethylcycloheptasiloxane were polymerized in accordance with the process of this invention. The procedure followed and the apparatus employed were identical to those disclosed in Example I. In each instance the pressure employed was 50,000 pounds per square inch and the catalyst employed was a potassium silanolate compound. The particular catalyst employed is disclosed below and was prepared in accordance with the procedure disclosed in Example IV.

*Table III*
POLYMERIZATION OF CYCLOSILOXANES

| | Cyclosiloxane | Catalyst | Amount of catalyst, percent by weight of cyclosiloxane | Temp. (°C.) | Time (hr.) | Nature of polymerized product |
|---|---|---|---|---|---|---|
| 1 | Decaethylcyclopentasiloxane | $KO(Et_2SiO)_6K$ | 1.0 | 290 | 15 | Slightly viscous (2,000 cp. at 25° C.). |
| 2 | ---do--- | $KO(Et_2SiO)_6K$ | 4.0 | 290 | 3½ | Slightly viscous (3,000 cp. at 25° C.). |
| 3 | Dodecaethylcyclohexasiloxane | $KO(Et_2SiO)_8K$ | 1.2 | 290 | ½ | Very viscous (12,000 cp. at 25° C.). |
| 4 | ---do--- | $KO(Et_2SiO)_6K$ | 1.0 | 290 | 1 | Very viscous (30,000 cp. at 25° C.). |
| 5 | Tetradecacycloheptasiloxane | $KO(Et_2SiO)_8K$ | 1.0 | 260 | 2½ | Semi-plastic and adhesive. |

*Table I*
POLYMERIZATION OF OCTAETHYLCYCLOTETRASILOXANE

| | Catalyst | Amount of catalyst, percent by weight of octaethyl-cyclotetra-siloxane | Temp. (°C.) | Time (hr.) | Nature of polymerization product |
|---|---|---|---|---|---|
| 1 | KOH | 1.0 | 290 | 2½ | Very viscous. |
| 2 | NaH | 1.0 | 250 | 18 | Very viscous material. |
| 3 | NaH | 1.0 | 250 | 64 | Extremely viscous. |
| 4 | KOSiMe₃ | 0.1 | 290 | 2 | Slightly viscous. |
| 5 | KOSiMe₃ | 0.5 | 290 | 1½ | Very viscous. |
| 6 | KOSiMe₃ | 1.0 | 290 | 1 | Do. |
| 7 | KOSiMe₃ | 3.5 | 290 | 1¾ | Do. |
| 8 | $KO(Et_2SiO)_6K$ | 0.3 | 290 | 2 | Do. |
| 9 | $KO(Et_2SiO)_8K$ | 1.0 | 290 | 2¼ | Extremely viscous. |
| 10 | $KO(Et_2SiO)_8K$ | 3.0 | 290 | 2 | Do. |
| 11 | $KO(Et_2SiO)_8K$ | 1.0 | 275 | 1¾ | Do. |

From the above table it is seen that octaethylcyclotetrasiloxane may be readily polymerized by the process of the invention. The particularly beneficial aspects of our process are apparent as heretofore extreme difficulty has been encountered in the polymerization of octaethylcyclotetrasiloxane.

From the above table, it is seen that the product obtained when treating decaethylcyclopentasiloxane in accordance with the invention, is not as viscous as that obtained when polymerizing dodecaethylcyclohexasiloxane or tetradecaethylcycloheptasiloxane. This indicates that decaethylcyclopentasiloxane is apparently more stable than its alkylcyclosiloxane homologues.

The particularly beneficial advantages of our invention are clearly illustrated by the following example which discloses the results obtained when polymerizing various dialkylcyclosiloxanes by our process and by the process of the prior art.

EXAMPLE XI

Polymerization of various dialkylcyclosiloxanes were conducted under both atmospheric pressure and at pressure in excess of 1500 pounds per square inch. In all reactions a potassium silanolate catalyst having the average composition, $KO(Et_2SiO)_8K$, was employed. This catalyst was prepared in accordance with the procedure outlined in Example IV. The polymerizations conducted under pressures within the scope of the invention were carried out under the conditions disclosed in Example I, while those conducted without the benefit of such pressures were carried out with identical equipment; however, a pressure of about 1000 pounds per square inch was employed to ensure closure of the capsule and to prevent vaporization of the compounds. The table below contains the data obtained.

*Table IV*

COMPARABLE POLYMERIZATION REACTIONS OF DIALKYLCYCLOSILOXANES

| Dialkylcyclosiloxane | Pressure, pounds per square inch | Temp. (° C.) | Time (hr.) | Amount of catalyst, percent by weight of cyclosiloxane | Product viscosity (centistokes)) |
|---|---|---|---|---|---|
| Hexaethylcyclotrisiloxane | 50,000 | 290 | 1 | 1.2 | >50,000 (25° C.). |
| Do | 1,000 | 290 | 2¼ | 1.2 | 76 (25° C.). |
| Octaethylcyclotetrasiloxane | 50,000 | 290 | 2¼ | 1.0 | 18,000 (25° C.). |
| Do | 1,000 | 290 | 2¼ | 1.0 | 12 (25° C.). |
| Decaethylcyclopentasiloxane | 50,000 | 290 | 2¼ | 1.0 | No change. |
| Do | 1,000 | 290 | 2¼ | 1.0 | Do. |
| Dodecaethylcyclohexasiloxane | 50,000 | 290 | 1 | 1.0 | 30,000 (25° C.). |
| Do | 1,000 | 290 | 1 | 1.0 | 21 (100° C.). |
| Tetradecaethylcycloheptasiloxane | 50,000 | 290 | 2½ | 1.0 | >100,000 (25° C.). |
| Do | 1,000 | 290 | 2½ | 1.0 | 40 (100° C.). |

The above table readily discloses the benefits obtained by the invention. Although in this example we obtained no polymerization of decaethylcyclopentasiloxane after 2¼ hours, it is noted that some polymerization of this compound was obtained in the polymerization reactions reported in Example X.

As previously indicated, the process of the present invention may be conducted by a continuous flow method. The examples below contain tabulated data obtained from polymerization reactions of dialkylcyclosiloxanes prepared by this method. The process was conducted by placing a dialkylcyclosiloxane and a catalyst in a feed reservoir, forcing the mixture from the reservoir to the intake side of a high pressure pump by charging dry nitrogen gas, at a pressure of 5 pounds per square inch, to the reservoir at a point above the level of the mixture. The high pressure pump had a ¼-inch diameter plunger which was caused to reciprocate through a stroke of 1⅝ inch by means of a mechanical drive. The mixture was compressed by the pump and fed to a reactor having a volume of 11.9 cubic inches. This reactor was constructed of heat treated low alloy steel, and had a ⅜-inch bore diameter, a wall thickness of ⅜-inch and a length of 9 feet. An external electrical heater was positioned about the reactor and a thermocouple was attached to the outer wall surface thereof to measure the temperature. The internal pressure of the system was controlled by means of a manually operated high pressure throttling type valve, and was measured by means of a calibrated electrical strain gage. The polymerized material was discharged from the reactor through the high pressure valve and led to a refrigerated receiver. Samples of the polymerized product were evaluated after the operating conditions had been stabilized at the desired level.

Operating conditions were varied for each reaction. This was accomplished as follows: the contact time was varied by changing the stroke of the pump, temperature was varied by means of a variable transformer connected to the heater, while the pressure was varied by manual operation of the control valve.

EXAMPLE XII

A mixed cyclicdimethylsiloxane hydrolyzate was obtained by the hydrolysis and condensation of commercially pure dimethyldichlorosilane (99.4%) by the isopropyl ether-ice water technique. The hydrolyzate was then stirred over calcium sulfate to remove the last traces of water. An approximate distillation analysis of this hydrolyzate is: 26% octamethylcyclotetrasiloxane, 22% decamethylcyclopentasiloxane and dodecamethylcyclohexasiloxane, and 52% of higher cyclosiloxanes.

The table below contains tabulated data relating to a number of continuous flow polymerization reactions conducted with the dimethyldichlorosilane hydrolyzate prepared above. The catalyst employed in all instances was the reaction product of a 21 to 1 weight ratio of dimethyl hydrolyzate to potassium hydroxide. This catalyst was prepared according to the procedure disclosed in Example IV and was employed in an amount of 2.5% by-weight of the dimethyldichlorosilane hydrolyzate. The viscosity of the hydrolyzate was 28 centipoises at 25° C.

*Table V*

CONTINUOUS FLOW POLYMERIZATIONS OF A DIMETHYLDICHLOROSILANE HYDROLYZATE

| | Pressure (p. s. i. g.) | Temperature (° C.) | Contact time (min.) | Product viscosity (cp. after 24 hr. at 25° C.) |
|---|---|---|---|---|
| 1 | 1,000 | 140–150 | 5.3 | 77. |
| 2 | 15,000 | 140–150 | 6.3 | 100. |
| 3 | 40,000 | 140–150 | 8.5 | 190. |
| 4 | 1,000 | 175 | 6.2 | 163. |
| 5 | 15,000 | 175 | 6.0 | 554. |
| 6 | 35,000 | 175 | 6.3 | 1,000. |
| 7 | 1,000 | 200 | 5.8 | 670. |
| 8 | 15,000 | 200 | 5.9 | 1,475. |
| 9 | 35,000 | 250 | 6.2 | Extremely viscous. |

EXAMPLE XIII

Employing the continuous flow method outlined above, we prepared several endblocked dimethyldisiloxane polymers from a dimethyldichlorosilane hydrolyzate obtained as disclosed in Example XII. The catalyst employed was potassium silanolate (prepared as disclosed in Example XII) being used in an amount of 2.5% by-weight of the hydrolyzate. We employed as the endblocking compound hexamethyldisiloxane. The table below contains a tabulated account of such polymerizations reactions.

*Table VI*

POLYMERIZATIONS OF A DIMETHYLDICHLOROSILANE HYDROLYZATE TO DIMETHYLSILOXANE ENDBLOCKED POLYMERS

| | Temperature (° C.) | Pressure (p. s. i. g.) | Percent Endblocker by Weight of hydrolyzate | Contact time (min.) | Product viscosity (cp.) |
|---|---|---|---|---|---|
| 1 | 200 | 35,000 | 1.4 | 6.1 | 355 at 28° C. |
| 2 | 225 | 5,000 | 1.15 | 7.1 | 225 at 24° C. |
| 3 | 225 | 40,000 | 1.15 | 7.0 | 325 at 26° C. |
| 4 | 260 | 5,000 | 1.15 | 5.9 | 270 at 26° C. |

EXAMPLE XIV

A diethylsiloxane hydrolyzate was obtained by hydrolyzing diethyldichlorosilane. The hydrolyzate was dried over calcium sulfate to remove as much as the condensed water as possible. Analysis of the hydrolyzate indicated that 1.04% hydroxyl and 0.43% chlorine by-weight was still present in the hydrolyzate. Distillation analysis indicated that the hydrolyzate contained 52% by-weight of hexaethylcyclotrisiloxane, the remainder of the hydrolyzate comprised higher cyclicsiloxanes. The table below contains tabulated data of a number of reactions wherein the hydrolyzate was polymerized by the continuous flow method hereinabove described. In each reaction the catalyst employed was a potassium silanolate which was prepared as outlined in Example XII and which was employed in an amount of 2.5% by weight of the hydrolyzate. The pressure for each reaction was 40,000 pounds per square inch.

*Table VII*

POLYMERIZATION OF A DIETHYLDICHLOROSILANE HYDROLYZATE

|   | Temperature (° C.) | Contact time (min.) | Product viscosity (cp.) |
|---|---|---|---|
| 1 | 225 | 8.8 | 340 at 26° C. |
| 2 | 250 | 13.6 | 372 at 26° C. |
| 3 | 280 | 8.9 | 416 at 22° C. |
| 4 | 310 | 6.9 | 300 at 27° C. |
| 5 | 340 | 7.6 | 256 at 26° C. |

It is well known that the dialkylsiloxane polymeric products prepared at atmospheric pressure by the processes of the prior art generally contain low boiling material comprising for the most part unpolymerized cyclosiloxanes. Consequently a stripping step is necessary to remove these fractions in order to obtain a product having low volatility at high temperatures. We have found that by employing the process of our invention a dialkylsiloxane polymeric product, such as an oil, prepared at atmospheric pressure may be materially improved. Particularly, we have found that, by employing a high pressure, we may polymerize a major portion of the unpolymerized cyclosiloxanes remaining in those oils prepared at atmospheric pressure. The following example more fully illustrates this aspect of our invention.

EXAMPLE XV

A dimethylsiloxane oil having a viscosity of 500 centipoises at 24° C. and a dimethylsiloxane oil having a viscosity of 750 centipoises at 24° C. were prepared by employing a potassium silanolate catalyst at atmospheric pressure. Hexamethyldisiloxane was employed as an endblocking compound to control the viscosity of the oils. Each of the oils prepared had approximately 10 to 11 weight percent of unpolymerized cyclosiloxanes. These oils containing the original catalyst were charged to a high pressure reactor and subjected to elevated pressures. The following table contains data concerning the conditions employed, approximate amount of unpolymerized material remaining in the oil, and final oil viscosity after processing at pressures above 1500 pounds per square inch. Three reactions were conducted with each oil.

*Table VIII*

HIGH PRESSURE PROCESSING OF DIMETHYLSILOXANE OILS

|   | Temperature (° C.) | Pressure (p.s.i.g.) | Contact time (min.) | Viscosity (cp. at 24° C.) | Percent by weight of oil of unreacted lights |
|---|---|---|---|---|---|
| 500 cp. at 24° C. oil: | | | | | |
| 1 | 100 | 40,000 | 46 | 500 | 7 |
| 2 | 130 | 40,000 | 20 | 520 | 6 |
| 3 | 150 | 37,000 | 5.5 | 550 | 3.5 |
| 750 cp. oil: | | | | | |
| 1 | 150 | 40,000 | 6.5 | 980 | 5 |
| 2 | 175 | 40,000 | 6.9 | 990 | 4.1 |
| 3 | 200 | 41,000 | 6.8 | 1,020 | 5.4 |

From the above disclosure, it is seen that our invention provides a new and improved process for readily polymerizing dialkylcyclosiloxanes. Moreover, we have shown that our invention makes possible the efficient polymerization of dialkylcyclosiloxanes which have heretofore been difficult to polymerize.

We claim:

1. A process for polymerizing a dialkylcyclosiloxane to a dialkylsiloxane polymer which comprises treating said dialkylcyclosiloxane with an alkaline catalyst under an applied pressure of at least 1500 pounds per square inch until said dialkylcyclosiloxane is polymerized.

2. A process for polymerizing hexaethylcyclotrisiloxane to a diethylsiloxane polymer which comprises treating said hexaethylcyclotrisiloxane with an alkaline catalyst under an applied pressure of at least 1500 pounds per square inch until said hexaethylcyclotrisiloxane is polymerized.

3. A process for polymerizing octaethylcyclotetrasiloxane to a diethylsiloxane polymer which comprises treating said octaethylcyclotetrasiloxane with an alkaline catalyst under an applied pressure of at least 1500 pounds per square inch until said octaethylcyclotetrasiloxane is polymerized.

4. A process for polymerizing dodecaethylcyclohexasiloxane to a diethylsiloxane polymer which comprises treating said dodecaethylcyclohexasiloxane with an alkaline catalyst under an applied pressure of at least 1500 pounds per square inch until said dodecaethylcyclohexasiloxane is polymerized.

5. A process for polymerizing tetradecaethylcycloheptasiloxane to a diethylsiloxane polymer which comprises treating said tetradecaethylcycloheptasiloxane with an alkaline catalyst under an applied pressure of at least 1500 pounds per square inch until said tetradecaethylcycloheptasiloxane is polymerized.

6. A process for polymerizing a cyclosiloxane having the formula $(R_2SiO)_z$ where R is an alkyl radical and $z$ is an integer of from 3 to 8 which comprises treating said cyclosiloxane with an alkaline catalyst under an applied pressure of at least 1500 pounds per square inch until said cyclosiloxane is polymerized.

7. A process for polymerizing a dialkylcyclosiloxane to a dialkylsiloxane polymer which comprises treating said dialkylcyclosiloxane with an alkaline catalyst at a temperature of from about 100° C. to about 350° C. and under an applied pressure of at least 1500 pounds per square inch until said dialkylcyclosiloxane is polymerized.

8. A process for polymerizing a dialkylcyclosiloxane to a dialkylsiloxane polymer which comprises treating said dialkylcyclosiloxane with an alkaline catalyst under an applied pressure of from about 15,000 to about 100,000 pounds per square inch until said dialkylcyclosiloxane is polymerized.

9. A process for polymerizing octamethylcyclotetrasiloxane to a dimethylsiloxane polymer which comprises treating said octamethylcyclotetrasiloxane with an alkaline catalyst under an applied pressure of at least 1500 pounds per square inch until said octamethylcyclotetrasiloxane is polymerized.

10. A process for polymerizing a dialkylcyclosiloxane to a dialkylsiloxane polymer which comprises treating said dialkylcyclosiloxane with sodium hydroxide under an applied pressure of at least 1500 pounds per square inch until said dialkylcyclosiloxane is polymerized.

11. A process for polymerizing a dialkylcyclosiloxane to a dialkylsiloxane polymer which comprises treating said dialkylcyclosiloxane with sodium hydride under an applied pressure of at least 1500 pounds per square inch until said dialkylcyclosiloxane is polymerized.

12. A process for polymerizing a dialkylcyclosiloxane to a dialkylsiloxane polymer which comprises treating said dialkylcyclosiloxane with potassium hydroxide under an applied pressure of at least 1500 pounds per square inch until said dialkylcyclosiloxane is polymerized.

13. A process for polymerizing a dialkylcyclosiloxane to a dialkylsiloxane polymer which comprises treating said dialkylcyclosiloxane with potassium trimethylsilanolate under an applied pressure of at least 1500 pounds per square inch until said dialkylcyclosiloxane is polymerized.

14. A process for polymerizing a dialkylcyclosiloxane to a dialkylsiloxane polymer which comprises treating said dialkylcyclosiloxane with a potassium silanolate under an applied pressure of at least 1500 pounds per square inch until said dialkylcyclosiloxane is polymerized.

15. A process for polymerizing a dialkylcyclosiloxane which comprises treating said dialkylcyclosiloxane with an alkaline catalyst under an applied pressure of at least 1500 pounds per square inch until said dialkylcyclosiloxane is polymerized, said alkaline catalyst comprising the product obtained by reacting potassium hydroxide with an alkylsiloxane.

16. A process for preparing an endblocked dialkylsiloxane polymer which comprises polymerizing a dialkylcyclosiloxane with an alkaline catalyst under an applied pressure of at least 1500 pounds per square inch in the presence of an endblocking compound until said dialkylcyclosiloxane is polymerized.

17. A process for preparing dialkylsiloxane polymers which comprises hydrolyzing a dialkylsilane having the formula $R_2SiY_2$ wherein R is an alkyl radical and Y is a hydrolyzable group taken from the group consisting of halogen, hydrogen and alkoxy radicals, and treating said hydrolyzed dialkylsilane with an alkaline catalyst under an applied pressure of at least 1500 pounds per square inch until said hydrolyzed dialkylsilane is polymerized.

18. In a process for preparing a dialkylsiloxane polymer wherein a hydrolyzable dialkylsilane is hydrolyzed and said hydrolyzed dialkylsilane is treated with an alkaline catalyst at atmospheric pressure to prepare a polymeric product comprising essentially a dialkylsiloxane polymer and non-polymerized siloxanes, the improvement which comprises compressing said product under an applied pressure of at least 1500 pounds per square inch until said non-polymerized siloxanes are polymerized.

19. A process for preparing dimethylsiloxane polymers which comprises hydrolyzing dimethyldichlorosilane and treating said hydrolyzed dimethyldichlorosilane with a potassium silanolate catalyst under an applied pressure of at least 1500 pounds per square inch until said hydrolyzed dimethyldichlorosilane is polymerized.

20. A process for preparing an endblock dimethylsiloxane polymer which comprises hydrolyzing dimethyldichlorosilane and treating said hydrolyzed dimethyldichlorosilane with an alkaline catalyst and an endblocking compound under an applied pressure of at least 1500 pounds per square inch until said hydrolyzed dimethyldichlorosilane is polymerized.

References Cited in the file of this patent

UNITED STATES PATENTS

| | | |
|---|---|---|
| 2,443,353 | Hyde | June 15, 1948 |
| 2,453,092 | Hyde | Nov. 2, 1948 |
| 2,489,138 | Hyde | Nov. 22, 1949 |
| 2,490,357 | Hyde | Dec. 6, 1949 |